United States Patent
Johnson

(10) Patent No.: US 9,957,868 B2
(45) Date of Patent: May 1, 2018

(54) CENTERLINE INJECTION SYSTEM FOR LIQUID-ONLY REDUCTANT DELIVERY

(71) Applicant: Cummins Emission Solutions, Inc., Columbus, IN (US)

(72) Inventor: Samuel Johnson, Bloomington, IN (US)

(73) Assignee: CUMMINS EMISSION SOLUTIONS, INC., Columbus, IN (US)

( * ) Notice: Subject to any disclaimer, the term of this patent is extended or adjusted under 35 U.S.C. 154(b) by 220 days.

(21) Appl. No.: 14/973,871

(22) Filed: Dec. 18, 2015

(65) Prior Publication Data

US 2016/0186631 A1    Jun. 30, 2016

(30) Foreign Application Priority Data

Dec. 26, 2014    (CN) ...................... 2014 2 0846698 U

(51) Int. Cl.
*F01N 3/20* (2006.01)
*F01N 3/28* (2006.01)
*B01D 53/94* (2006.01)

(52) U.S. Cl.
CPC ............. *F01N 3/2066* (2013.01); *F01N 3/28* (2013.01); *B01D 53/9431* (2013.01); *B01D 2251/2067* (2013.01); *B01D 2258/012* (2013.01); *B01D 2259/124* (2013.01); *F01N 2610/02* (2013.01); *F01N 2610/1453* (2013.01); *Y02T 10/24* (2013.01)

(58) Field of Classification Search
None
See application file for complete search history.

(56) References Cited

U.S. PATENT DOCUMENTS

| 8,752,365 | B2 | 6/2014 | Campbell et al. | |
|---|---|---|---|---|
| 2006/0037309 | A1* | 2/2006 | Funk ................. | B01D 53/9431 60/286 |
| 2009/0092525 | A1* | 4/2009 | Ichikawa ............... | B01D 53/90 422/177 |
| 2012/0020854 | A1* | 1/2012 | Makartchouk ........ | F01N 3/2066 423/210 |

* cited by examiner

Primary Examiner — Walter D. Griffin
Assistant Examiner — Jelitza M Perez
(74) Attorney, Agent, or Firm — Foley & Lardner LLP

(57) ABSTRACT

A centerline injection system for a liquid-only reductant delivery. An aftertreatment system comprises an aftertreatment component structured to treat exhaust exiting an engine, a reactor pipe, and a liquid-only dosing unit. The reactor pipe is positioned upstream of the aftertreatment component and is structured to receive the exhaust from the engine. The liquid-only dosing unit is structured to inject diesel exhaust fluid into the exhaust received from an engine. The liquid-only dosing unit injects the diesel exhaust fluid at the centerline of the reactor pipe as to provide uniform dispersion of the diesel exhaust fluid across at least a part of the aftertreatment component.

19 Claims, 4 Drawing Sheets

Exhaust Flow

CENTERLINE INJECTION SYSTEM FOR LIQUID-ONLY REDUCTANT DELIVERY

CROSS REFERENCE TO RELATED APPLICATIONS

The present application claims the benefit of and priority to Chinese Utility Model Application No. ZL201420846698.4, filed Dec. 26, 2014, which issued on Aug. 12, 2015 as Chinese Utility Model No. ZL201420846698.4. The contents of this application is incorporated herein by reference in its entirety.

TECHNICAL FIELD

The present disclosure relates generally to liquid-only dosing units used in aftertreatment systems for treating exhaust from internal combustion engines.

BACKGROUND

Aftertreatment systems are an important technology for reducing harmful emissions from internal combustion engines. Aftertreatment systems generally include a source of storage for reductant (particularly diesel exhaust fluid) and a dosing unit that includes a pump unit for pressurizing the reductant. The aftertreatment systems may also include a metering unit for providing a controlled amount or rate of reductant into a stream of exhaust and an injector, which provides a reductant solution to a decomposition region of an exhaust flow path located upstream of an aftertreatment component (for example, a selective catalytic reduction catalyst).

Various aftertreatment systems utilize liquid-only (i.e., non-air-assisted) dosing units to inject a reductant such as diesel exhaust fluid into a stream of exhaust within an exhaust pipe. Such systems currently employ tangential and/or wall injection methods, which require hardware that enables recirculation zones and nucleation sites for urea deposits to grow. For example, a nucleation creator (i.e., a downstream mixing plate) is currently used to achieve uniformity of diesel exhaust fluid in the exhaust stream prior to reaching the aftertreatment component.

SUMMARY

Various embodiments provide for an aftertreatment system comprising an aftertreatment component structured to treat exhaust exiting an engine, a reactor pipe, and a liquid-only dosing unit. The reactor pipe is positioned upstream of the aftertreatment component and is structured to receive the exhaust from the engine. The liquid-only dosing unit is structured to inject diesel exhaust fluid into the exhaust received from the engine. The liquid-only dosing unit injects the diesel exhaust fluid at the centerline of the reactor pipe to provide uniform dispersion of the diesel exhaust fluid across at least a part of the aftertreatment component.

Further embodiments provide for a centerline injection system for injecting diesel exhaust fluid into exhaust exiting an engine. The centerline injection system comprises a reactor pipe, a liquid-only dosing unit, and a knife-edge mount. The reactor pipe is positioned upstream of an aftertreatment component configured to treat the exhaust and is structured to receive the exhaust from the engine. The liquid-only dosing unit is structured to inject diesel exhaust fluid into the exhaust. The liquid-only dosing unit injects the diesel exhaust fluid at a centerline of the reactor pipe so as to provide uniform dispersion of the diesel exhaust fluid across at least a part of the aftertreatment component. The knife-edge mount is structured to mount the liquid-only dosing unit injector inside the reactor pipe. The knife-edge mount has a trailing edge and a leading edge, each having a knife-edge structure so as to minimize recirculation zones and exhaust deviation.

BRIEF DESCRIPTION OF THE DRAWINGS

The details of one or more implementations of the subject matter described in this specification are set forth in the accompanying drawings and the description below. Other features and aspects of the subject matter will become apparent from the description, the drawings, and the claims presented herein.

DETAILED DESCRIPTION

Figure 1:
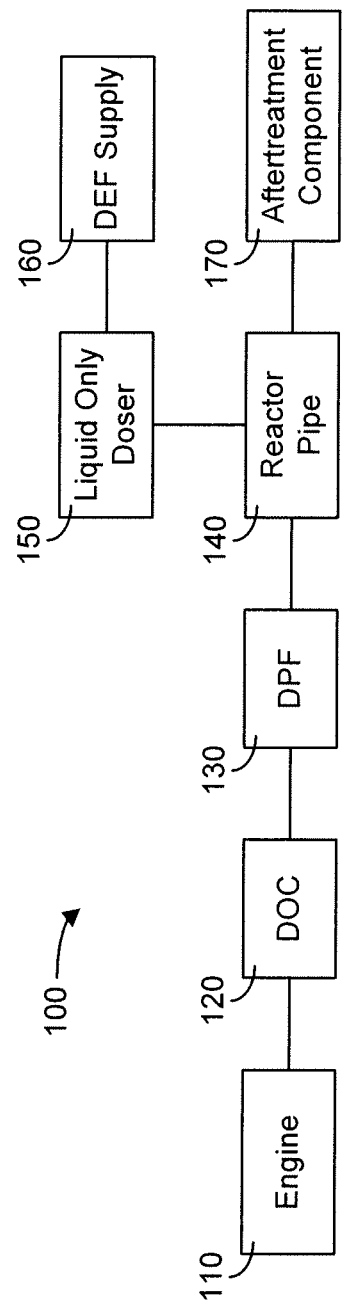
FIG. 1 is a schematic view of a system including a liquid-only dosing unit, according to an example embodiment.

For the purposes of promoting an understanding of the principles of the disclosure, reference will now be made to the embodiments illustrated in the drawings and specific language will be used to describe the same. It will nevertheless be understood that no limitation of the scope of the disclosure is thereby intended, any alterations and further modifications in the illustrated embodiments, and any further applications of the principles of the disclosure as illustrated therein as would normally occur to one skilled in the art to which the disclosure relates are contemplated herein.

The apparatus and systems described herein relate to a system that includes a liquid-only dosing unit that injects diesel exhaust fluid at a centerline of a major axis (i.e., along the primary flow direction) of a decomposition reactor pipe (also referred to as "reactor pipe") used in an aftertreatment system. The reactor pipe can be used with an aftertreatment component, such as a selective catalytic reduction catalyst. According to one embodiment, the reactor pipe serves as a decomposition chamber in which exhaust from an engine interacts with a reductant (e.g., diesel exhaust fluid). Further embodiments of the systems described herein also include a reductant injector mount structured to minimize exhaust flow deviation and eliminate recirculation zones (for example, at the tip of an injector.) The use of the mount may further eliminate hardware that enables deposit nucleation. According to several embodiments, the systems and apparatuses described herein provides an injection site that maximizes uniformity of reductant (i.e., diesel exhaust fluid) within a decomposition reactor pipe. Further benefits realized by implementing the features described herein include minimized urea deposits along the interior surface of the decomposition reactor pipe.

Referring to FIG. 1, a schematic view of a system 100 including a decomposition reactor pipe 140 according to an example embodiment is shown. The system 100 comprises an engine 110, a diesel oxidation catalyst 120, a diesel particulate filter 130, a decomposition reactor pipe 140, a liquid-only dosing unit 150, a diesel exhaust fluid supply 160, and an aftertreatment component 170. The system 100 may also include a delivery mechanism for delivering reductant (e.g., diesel exhaust fluid) from the diesel exhaust fluid supply 160 (for example, a storage tank) to an exhaust system connected to an engine 110. In one embodiment, the system 100 is provided on a vehicle powered by the engine 110. In other embodiments, the system 100 may be provided on an engine 110 utilized in other applications such as power generation, pumping systems, or any other application that receives or uses power from the engine 110.

The engine 110 can be a diesel engine or any suitable internal combustion engine for which exhaust treatment with a reductant is provided. The engine 110 creates exhaust from combustions occurring within the engine cylinders when the engine 110 is operating. The engine 110 can include one or more engine cylinders that receive fuel and air through an intake system (not shown) to create combustion. In some embodiments, an intake system may include a turbocharger that receives pressured air from the atmosphere and transfers the air to an intake manifold connected to the engine cylinders. The energy released by combustion within the engine cylinders is used to propel, for example, a vehicle hosting the engine 110. The exhaust resulting from the combustion may exit the engine through an exhaust manifold (not shown).

The exhaust may pass through several components before entering the atmosphere. Still referring to FIG. 1, the exhaust may exit the engine 110 and flow into the diesel oxidation catalyst 120. The diesel oxidation catalyst 120 is an aftertreatment for exhaust that oxidizes elements found within the exhaust. For example, the diesel oxidation catalyst 120 may oxidize hydrocarbons and carbon monoxide into carbon dioxide and water. The exhaust may also pass through the diesel particulate filter 130, which filters out particulate matter and soot from the exhaust. Upon exiting the diesel particulate filter 130, the exhaust may flow into a decomposition reactor pipe 140. The decomposition reactor pipe 140 is configured to receive the exhaust into a conduit thereof, along with a reductant such that the exhaust and the reductant can properly mix and decompose. The reductant, in the foam of diesel exhaust fluid in a typical implementation, may comprise a urea-based solution that mixes with the exhaust to chemically decompose into ammonia. One example of diesel exhaust fluid comprises a solution of 32.5% high purity urea and 67.5% deionized water. It shall be appreciated, however, that other diesel exhaust fluid solutions and reductants may also be utilized. As discussed above, the decomposition reactor pipe 140 serves as a chamber for diesel exhaust fluid to interact with elements in the exhaust and decompose into ammonia.

According to some embodiments, the liquid-only dosing unit 150 is connected to the decomposition reactor pipe 140 to transfer diesel exhaust fluid to the decomposition reactor pipe 140. The liquid-only dosing unit 150 may include an injector configured to inject the diesel exhaust fluid into the exhaust flowing through the decomposition reactor pipe 140. The liquid-only dosing unit 150 is mounted such that the injector is configured to inject diesel exhaust fluid at and/or proximate a centerline of the decomposition reactor pipe 140. The liquid-only dosing unit 150 receives diesel exhaust fluid from the diesel exhaust fluid supply 160, which stores a supply of diesel exhaust fluid for use in the aftertreatment system.

The exhaust flows out of the reactor pipe 150 into the aftertreatment component 170 as shown in FIG. 1. The aftertreatment component 170 can comprise a selective catalytic reduction catalyst. According to one embodiment, the aftertreatment component 170 can be used to convert nitrogen oxides into less harmful substances such as nitrogen and water. To facilitate the conversion, the aftertreatment component 170 uses a reductant such as urea to reduce the nitrogen oxides into diatomic nitrogen and water, for example.

The liquid-only dosing unit 150 may include various structures to facilitate transfer of the diesel exhaust fluid from the diesel exhaust fluid supply 160 to the liquid-only dosing unit 150 and the delivery of the diesel exhaust fluid to parts of an exhaust system (e.g., the decomposition reactor pipe 140). For example, the liquid-only dosing unit 150 can include a pump, a filter screen, and a check valve upstream of the pump to receive diesel exhaust fluid from the diesel exhaust fluid supply 160. In one form, the pump is a diaphragm pump, although it shall be appreciated that any other type of pump may be utilized. The pump outputs pressurized diesel exhaust fluid at a predetermined pressure, which can flow through a second check valve, a pulsation dampener, and a second filter to provide pressurized reductant to a metering valve (i.e., the injector).

The diesel exhaust fluid supply 160 holds a supply of diesel exhaust fluid and can be vented to allow the reductant to be withdrawn at a port in the diesel exhaust fluid supply 160 storage tank, for example. A conduit can extend from the port on the diesel exhaust fluid supply 160 to the liquid-only dosing unit 150 to allow the liquid-only dosing unit 150 to be in fluid communication with the diesel exhaust fluid supply 160. The liquid-only dosing unit 150 may also be in fluid communication with the injector. When the liquid-only dosing unit 150 operates, it draws reductant from the diesel exhaust fluid supply 160 through the conduit and transfers the reductant to the injector. A backflow conduit (not shown) may be provided to return excess reductant to the diesel exhaust fluid supply 160. According to some embodiments, the liquid-only dosing unit 150 is controlled through a controller.

Figure 2:
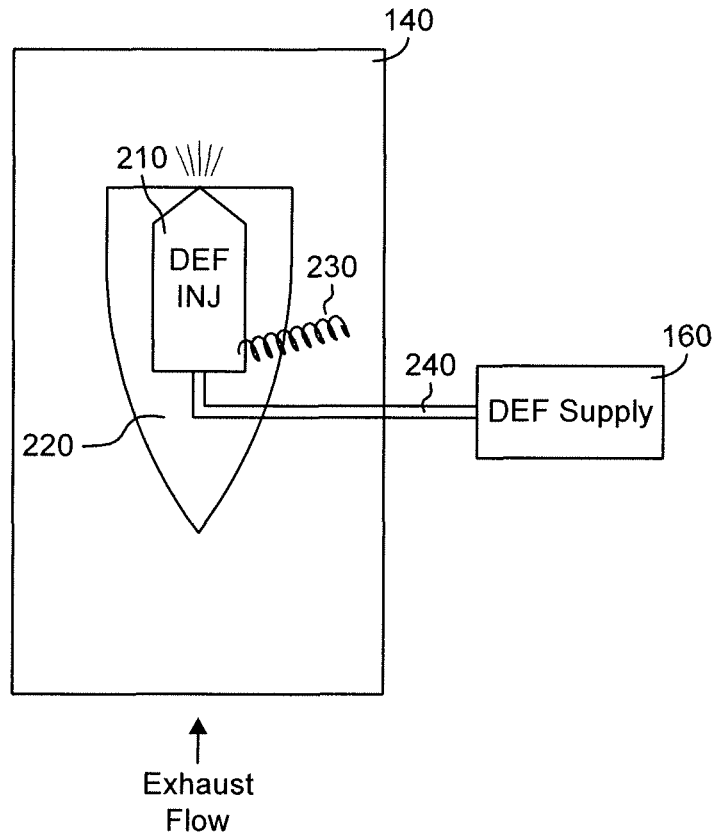
FIG. 2 a top cross-sectional view of one embodiment of a decomposition reactor pipe connected to an injector of a liquid-only dosing unit.

Referring to FIG. 2, a top cross-sectional view of one embodiment of a decomposition reactor pipe 140 connected to an injector 210 of a liquid-only dosing unit 150 is shown. The injector 210 injects diesel exhaust fluid into the exhaust stream at the centerline of the decomposition reactor pipe 140. In FIG. 2, the injector 210 is shown to inject diesel exhaust fluid into the decomposition reactor pipe 140 along the same direction as the exhaust stream flowing through the decomposition reactor pipe 140. The centerline injection of diesel exhaust fluid provides greater uniformity across the selective catalytic reduction catalyst, for example, with less additional components to mix the reductant with the exhaust. For example, fewer flow mixer components are required to mix the diesel exhaust fluid with the exhaust as centerline injection allows for mixing without the use of additional structure.

FIG. 2 further shows a "knife-edge" diesel exhaust fluid injector mount 220 configured to mount the injector 210 of the liquid-only dosing unit 150 at the center of the decomposition reactor pipe 140. It should be noted that the term "knife-edge," as used herein, should be interpreted broadly.

By way of example, "knife-edge" may refer to an elongated pointed structure akin to the edge at a sharp end of a knife. However, this term should e interpreted in a manner as would be readily understood by one of ordinary skill in the art. The knife-edge diesel exhaust fluid injector mount 220 facilitates alignment of the injector 210 so as to allow the injector 210 to inject diesel exhaust fluid proximate the centerline of the decomposition reactor pipe 140. Impingement of the diesel exhaust fluid against the walls of the decomposition reactor pipe 140 is minimized by the momentum of the exhaust traversing through the decomposition reactor pipe 140. In some embodiments, the knife-edge diesel exhaust fluid injector mount 220 is structured to fit inside standard exhaust pipe tubing (e.g., 5-6 inches in diameter, cylindrical in shape). The knife-edge diesel exhaust fluid injector mount 220 attaches on an interior surface of the exhaust piping (e.g., the decomposition reactor pipe 140) and is directly exposed to the exhaust stream flowing through the exhaust pipe to which the knife-edge diesel exhaust fluid injector mount 220 is attached. The placement of the knife-edge diesel exhaust fluid injector mount 220 within the decomposition reactor pipe 140 also provides insulation to the injector 210 of the liquid-only dosing unit 150 attached to the knife-edge diesel exhaust fluid injector mount 220. The knife-edge diesel exhaust fluid injector mount 220 is sealed as to prevent leakage of exhaust gases. In some embodiments, one or more edges of the knife-edge diesel exhaust fluid injector mount 220 are pointed in a structure akin to the point of a knife (referenced as knife-edge throughout). For example, the leading edge of the knife-edge diesel exhaust fluid injector mount 220 that is exposed to the exhaust stream is a knife-edge in some embodiments. The pointed knife edge(s) of the knife-edge diesel exhaust fluid injector mount 220 minimizes deviation of exhaust flow lines and pressure drop in the decomposition reactor pipe 140. In other embodiments, a trailing edge of the knife-edge diesel exhaust fluid injector mount 220 is also structured similar to the point of a knife (i.e., knife-edged). The trailing edge of the knife-edge diesel exhaust fluid injector mount 220 is structured to enable smooth exhaust flow transition along the decomposition reactor pipe 140.

The knife-edge shapes of the leading edge and/or the trailing edge, along with a converging geometry of the decomposition reactor pipe 140, further disable recirculation zones within various portions of the decomposition reactor pipe 140. For example, the knife-edges disable recirculation zones near the tip of the injector 210 exposed within the decomposition reactor pipe 140. The decomposition reactor pipe 140 and the knife-edge diesel exhaust fluid injector mount 220 are configured with ports, as necessary, for routing of various lines. For example, the decomposition reactor pipe 140 and the knife-edge diesel exhaust fluid injector mount 220 are structured to allow for the diesel exhaust fluid line 240, which serves as a conduit for the transfer of diesel exhaust fluid between the injector 210 and the diesel exhaust fluid supply 160. In embodiments employing electrical lines 230 for communication with components such as a controller, the decomposition reactor pipe 140 and/or the knife-edge diesel exhaust fluid injector mount 220 are structured to allow for adequate communication through the electrical lines 230. Thus, in some embodiments, the decomposition reactor pipe 140 and/or the knife-edge diesel exhaust fluid injector mount 220 contain ports that receive electrical lines 230 to facilitate the communication above. In some embodiments, the liquid-only dosing unit 150 can employ wireless communication methods to inject diesel exhaust fluid into the stream of the exhaust. Additionally, the decomposition reactor pipe 140 and/or the knife-edge diesel exhaust fluid injector mount 220 may include ports for one more coolant lines for the system.

Figure 3:
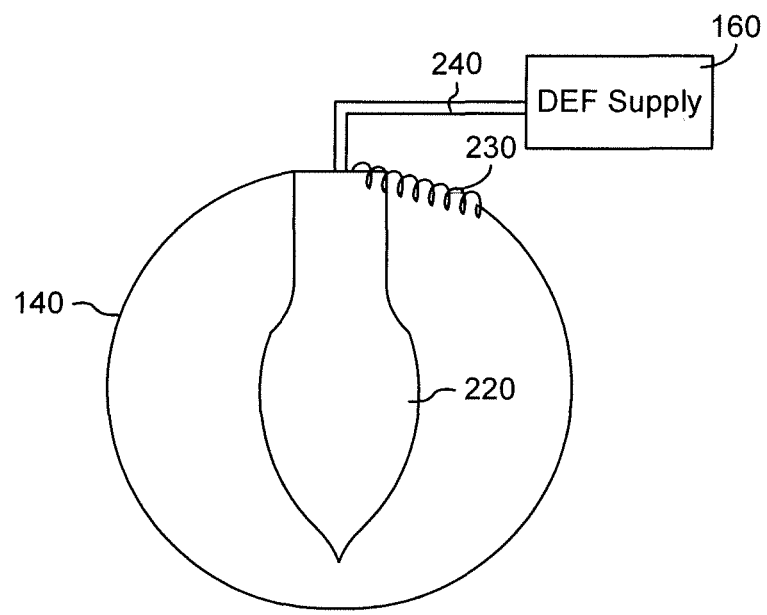
FIG. 3 is a front view of the decomposition reactor pipe of FIG. 2.
Figure 4:
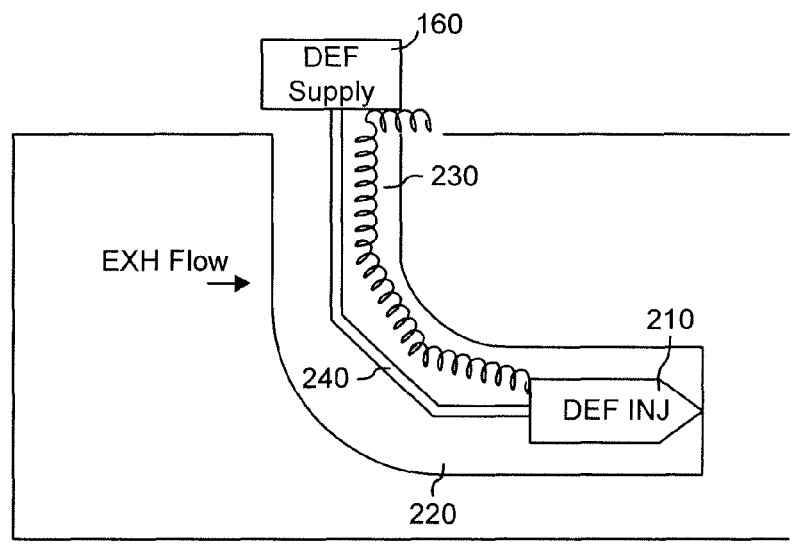
FIG. 4 is a side cross-sectional view of the decomposition reactor pipe of FIG. 2.

FIG. 3 and FIG. 4 show various views of the decomposition reactor pipe 140 of FIG. 2. Shown in FIG. 3 is a front view of the decomposition reactor pipe of FIG. 2. The knife-edge diesel exhaust fluid injector mount 220 is positioned in the center of the decomposition reactor pipe 140 to facilitate centerline injection of diesel exhaust fluid into decomposition reactor pipe 140 by an injector 210. The diesel exhaust fluid line 240 is shown between the decomposition reactor pipe 140 and the diesel exhaust fluid supply 160. An electrical line 230 is also shown attached to the knife-edge diesel exhaust fluid injector mount 220, although wireless communication technology can be employed in the system. FIG. 4 displays a side cross-sectional view of the decomposition reactor pipe 140 of FIG. 2 and FIG. 3. The injector 210 is shown attached to the knife-edge diesel exhaust fluid injector mount 220, which protrudes within the cavity of the decomposition reactor pipe 140 to allow the injector 210 to inject diesel exhaust fluid near the centerline of the decomposition reactor pipe 140. Diesel exhaust fluid line 240 and electrical lines 230 are also shown connected to the injector 210.

Figure 5:
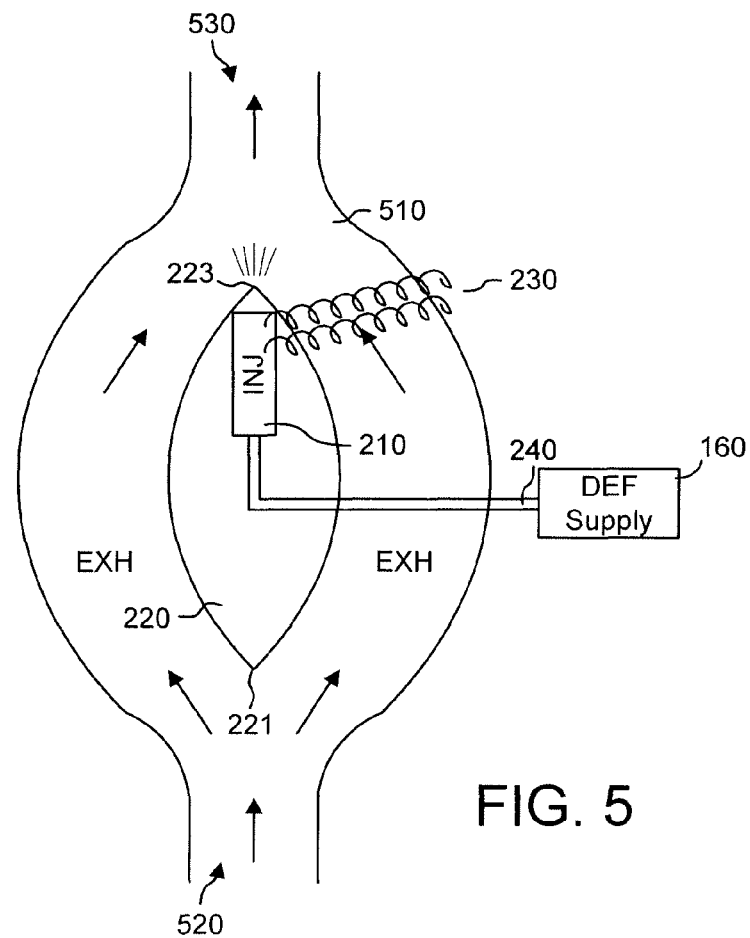
FIG. 5 is a cross-sectional view of a converging decomposition reactor pipe with centerline injection of diesel exhaust fluid, according to one embodiment.

FIG. 5 is a cross-sectional view of a converging decomposition reactor pipe 510 with centerline injection of diesel exhaust fluid, according to one embodiment. The converging decomposition reactor pipe 510 comprises a geometrical structure with converging sides of the pipe, i.e., the decomposition reactor pipe 510 possesses a converging geometry towards one end thereof. As the converging decomposition reactor pipe 510 extends from the middle of the pipe towards either end of the pipe, the radial distance around the pipe converges from a larger distance to a shorter distance. The converging decomposition reactor pipe 510 has an inlet 520 and an outlet 530. Exhaust gas from an engine 110 enters into the inlet 520 of the converging decomposition reactor pipe 510 and traverses throughout the length of the converging decomposition reactor pipe 510. The exhaust gas exits the converging decomposition reactor pipe 510 through the outlet 530. The converging decomposition reactor pipe 510 converges towards the inlet 520 and the outlet 530. The geometrical structure of the converging decomposition reactor pipe 510 enables centerline dosing of diesel exhaust fluid into the converging decomposition reactor pipe 510. The converging decomposition reactor pipe 510 further promotes mixing of the diesel exhaust fluid with the exhaust due to momentum and motion of the exhaust through the converging decomposition reactor pipe 510.

As shown in FIG. 5, the geometrical shape of the converging walls of the converging decomposition reactor pipe 510 further enables ease of routing the diesel exhaust fluid line 240, electrical lines 230, coolant lines, etc. According to some embodiments, the converging decomposition reactor pipe 510 uses the knife-edge diesel exhaust fluid injector mount 220 discussed above to allow the liquid-only dosing unit 150 to inject diesel exhaust fluid into a centerline of the exhaust stream within the converging decomposition reactor pipe 510. In FIG. 5, the knife-edge diesel exhaust fluid injector mount 220 is shown having both a trailing edge 223 and a leading edge 221 each with a knife-point shape. The leading edge 221 of the knife-edge diesel exhaust fluid injector mount 220 points towards oncoming exhaust flow and minimizes recirculation zones. The leading edge 221 of the knife-edge diesel exhaust fluid injector mount 220 minimizes deviation of exhaust flow lines and minimizes pressure drop in exhaust piping. The trailing edge 223 points in the same direction as oncoming exhaust flow and is structured to enable smooth exhaust flow transition throughout the converging decomposition reactor pipe 510. The trailing edge 223 further disables recirculation zones near the injector tip, minimizes deviation of exhaust flows, and minimizes pressure drop in the exhaust piping (e.g., the decomposition reactor pipe 140 and the converging decomposition reactor pipe 510). The knife-edge diesel exhaust fluid injector mount 220 of FIG. 5 is fully sealed as to eliminate leakage of exhaust gases from the converging decomposition reactor pipe 510.

Figure 6:
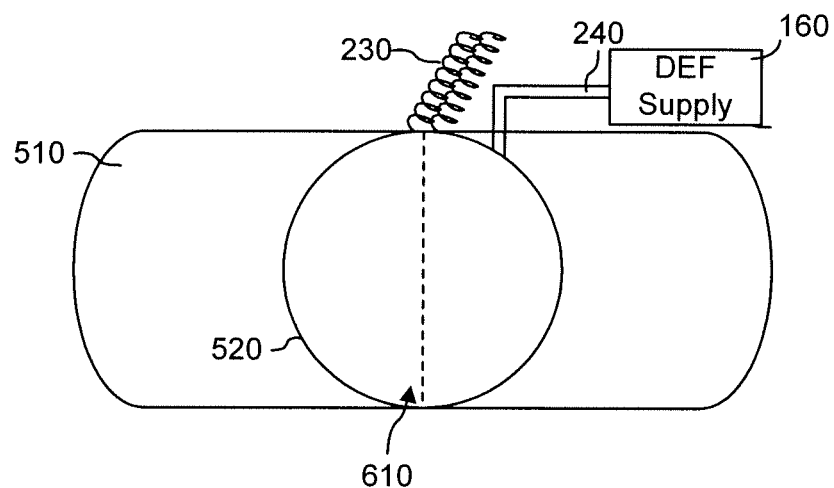
FIG. 6 is a front view of the converging decomposition reactor pipe of FIG. 5.
Figure 7:
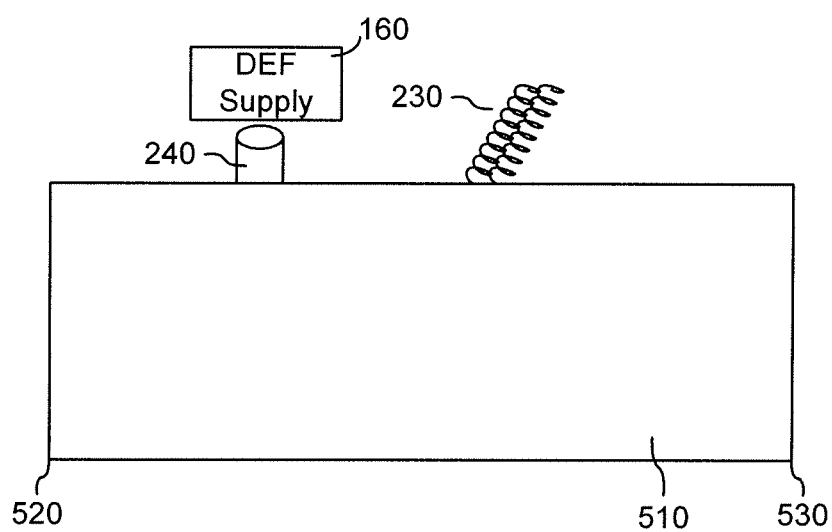
FIG. 7 is side view of the converging decomposition reactor pipe of FIG. 5.

FIG. 6 and FIG. 7 show various views of the converging decomposition reactor pipe 510 of FIG. 5. Shown in FIG. 6 is a front view of the converging decomposition reactor pipe 510 of FIG. 5. The injector 210 injects diesel exhaust fluid into the converging decomposition reactor pipe 510 at the centerline 610. The diesel exhaust fluid line 240 is shown between the decomposition reactor pipe 140 and the diesel exhaust fluid supply 160. An electrical line 230 is also shown connected to the knife-edge diesel exhaust fluid injector mount 220. FIG. 7 displays a side view of the converging decomposition reactor pipe 510 of FIG. 5. As discussed above, exhaust enters into the converging decomposition reactor pipe 510 through the inlet 520 and exits the converging decomposition reactor pipe 510 through the outlet 530. The diesel exhaust fluid line 240 and electrical line 230 are also shown communicatively coupled to the converging decomposition reactor pipe 510.

The foregoing description of embodiments of the disclosure has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the disclosure in various embodiments and with various modifications as are suited to the particular use contemplated. Other substitutions, modifications, changes and omissions may be made in the disclosure's operating conditions and arrangement of the embodiments without departing from the scope of the present invention. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed:

1. An aftertreatment system, comprising:
an aftertreatment component structured to treat exhaust exiting an engine;
a reactor pipe positioned upstream of the aftertreatment component, the reactor pipe structured to receive the exhaust from the engine;
a liquid-only dosing unit structured to inject diesel exhaust fluid into the exhaust received from the engine, wherein the liquid-only dosing unit injects the diesel exhaust fluid at a centerline of the reactor pipe so as to provide uniform dispersion of the diesel exhaust fluid across at least a part of the aftertreatment component; and
a knife-edge mount structured to mount the liquid-only dosing unit injector inside the reactor pipe, the knife edge mount comprising:
a leading edge comprising a knife edge structure, the leading edge pointing towards an oncoming exhaust flow of the exhaust, and
a trailing edge comprising a knife edge structure, the trailing edge pointing away from the exhaust flow.

2. The system of claim 1, wherein:
the reactor pipe possess a converging geometry towards at least one end of the reactor pipe; and
the knife-edge structure and the converging geometry of the reactor pipe provide insulation from the exhaust gases for protection of the liquid-only dosing unit.

3. The system of claim 1, wherein:
the reactor pipe possess a converging geometry towards at least one end of the reactor pipe; and
the knife-edge structure and the converging geometry of the reactor pipe serve to minimize pressure drop and recirculation zones of the exhaust.

4. The system of claim 1, wherein the liquid-only dosing unit injects the diesel exhaust fluid at the centerline of the exhaust flowing through the reactor pipe so as to provide uniform dispersion of the diesel exhaust fluid across at least a part of the aftertreatment component.

5. The system of claim 1, wherein the reactor pipe comprises a plurality of converging walls structured to converge towards at least one end of the reactor pipe.

6. The system of claim 1, wherein the knife-edge mount is fully sealed so as to prevent leakage of the exhaust out of the reactor pipe.

7. The system of claim 1, wherein the reactor pipe comprises one or more ports configured to receive one or more coolant lines, electrical lines, and reductant supply lines.

8. The system of claim 1, wherein the momentum of the exhaust through the reactor pipe promotes mixing of the diesel exhaust fluid injected at the centerline of the reactor pipe.

9. A centerline injection system for injecting diesel exhaust fluid into exhaust exiting an engine, the centerline injection system comprising:
a reactor pipe positioned upstream of an aftertreatment component configured to treat the exhaust exiting the engine, the reactor pipe structured to receive the exhaust from the engine;
a liquid-only dosing unit structured to inject diesel exhaust fluid into the exhaust, wherein the liquid-only dosing unit injects the diesel exhaust fluid at a centerline of the reactor pipe so as to provide uniform dispersion of the diesel exhaust fluid across at least a part of the aftertreatment component; and
a knife-edge mount structured to mount the liquid-only dosing unit injector inside the reactor pipe, the knife-edge mount having a trailing edge and a leading edge, each having a knife edge structure so as to minimize recirculation zones and exhaust deviation, the trailing edge pointing away from the exhaust flow of the exhaust, and the leading edge pointing towards the oncoming exhaust flow.

10. The system of claim 9, wherein the liquid-only dosing unit injects the diesel exhaust fluid at the centerline of the exhaust flowing through the reactor pipe so as to provide uniform dispersion of the diesel exhaust fluid across at least a part of the aftertreatment component.

11. The system of claim 9, wherein the reactor pipe comprises a plurality of converging walls structured to converge toward one or more ends of the reactor pipe.

12. The system of claim 9, wherein the knife-edge mount is fully sealed so as to prevent leakage of the exhaust out of the reactor pipe.

13. The system of claim 9, wherein the reactor pipe and the knife-edge mount comprises one or more ports configured to receive one or more coolant lines, electrical lines, and reductant supply lines.

14. An aftertreatment system, comprising:
a an aftertreatment component structured to treat exhaust exiting an engine;
a reactor pipe positioned upstream of the aftertreatment component, the reactor pipe structured to receive the exhaust from the engine, the reactor pipe possessing a converging geometry towards at least one end of the reactor pipe;
a liquid-only dosing unit structured to inject diesel exhaust fluid into the exhaust received from the engine, wherein the liquid-only dosing unit injects the diesel exhaust fluid at a centerline of the reactor pipe so as to provide uniform dispersion of the diesel exhaust fluid across at least a part of the aftertreatment component; and
a knife-edge mount structured to mount the liquid-only dosing unit injector inside the reactor pipe, the knife-edge mount having a leading edge and a trailing edge, at least one of the leading edge and the trailing edge comprising a knife-edge structure,
wherein the knife-edge structure and the converging geometry of the reactor pipe provide insulation from the exhaust gases for protection of the liquid-only dosing unit.

15. An aftertreatment system, comprising:
an aftertreatment component structured to treat exhaust exiting an engine;
a reactor pipe positioned upstream of the aftertreatment component, the reactor pipe structured to receive the exhaust from the engine, the reactor pipe possessing a converging geometry towards at least one end of the reactor pipe;
a liquid-only dosing unit structured to inject diesel exhaust fluid into the exhaust received from the engine, wherein the liquid-only dosing unit injects the diesel exhaust fluid at a centerline of the reactor pipe so as to provide uniform dispersion of the diesel exhaust fluid across at least a part of the aftertreatment component; and
a knife-edge mount structured to mount the liquid-only dosing unit injector inside the reactor pipe, the knife-edge mount having a leading edge and a trailing edge, at least one of the leading edge and the trailing edge comprising a knife-edge structure,
wherein the knife-edge structure and the converging geometry of the reactor pipe serve to minimize pressure drop and recirculation zones of the exhaust.

16. An aftertreatment system, comprising:
an aftertreatment component structured to treat exhaust exiting an engine;
a reactor pipe positioned upstream of the aftertreatment component, the reactor pipe structured to receive the exhaust from the engine, the reactor pipe comprising a plurality of converging walls structured to converge towards at least one end of the reactor pipe; and
a liquid-only dosing unit structured to inject diesel exhaust fluid into the exhaust received from the engine, wherein the liquid-only dosing unit injects the diesel exhaust fluid at a centerline of the reactor pipe so as to provide uniform dispersion of the diesel exhaust fluid across at least a part of the aftertreatment component.

17. An aftertreatment system, comprising:
an aftertreatment component structured to treat exhaust exiting an engine;
a reactor pipe positioned upstream of the aftertreatment component, the reactor pipe structured to receive the exhaust from the engine, the reactor pipe comprising one or more ports configured to receive one or more coolant lines, electrical lines, and reductant supply lines; and
a liquid-only dosing unit structured to inject diesel exhaust fluid into the exhaust received from the engine, wherein the liquid-only dosing unit injects the diesel exhaust fluid at a centerline of the reactor pipe so as to provide uniform dispersion of the diesel exhaust fluid across at least a part of the aftertreatment component.

18. A centerline injection system for injecting diesel exhaust fluid into exhaust exiting an engine, the centerline injection system comprising:
a reactor pipe positioned upstream of an aftertreatment component configured to treat the exhaust exiting the engine, the reactor pipe structured to receive the exhaust from the engine, the reactor pipe comprising a plurality of converging walls structured to converge toward one or more ends of the reactor pipe;
a liquid-only dosing unit structured to inject diesel exhaust fluid into the exhaust, wherein the liquid-only dosing unit injects the diesel exhaust fluid at a centerline of the reactor pipe so as to provide uniform dispersion of the diesel exhaust fluid across at least a part of the aftertreatment component; and
a knife-edge mount structured to mount the liquid-only dosing unit injector inside the reactor pipe, the knife-edge mount having a trailing edge and a leading edge, each having a knife edge structure so as to minimize recirculation zones and exhaust deviation.

19. A centerline injection system for injecting diesel exhaust fluid into exhaust exiting an engine, the centerline injection system comprising:
a reactor pipe positioned upstream of an aftertreatment component configured to treat the exhaust exiting the engine, the reactor pipe structured to receive the exhaust from the engine;
a liquid-only dosing unit structured to inject diesel exhaust fluid into the exhaust, wherein the liquid-only dosing unit injects the diesel exhaust fluid at a centerline of the reactor pipe so as to provide uniform dispersion of the diesel exhaust fluid across at least a part of the aftertreatment component; and
a knife-edge mount structured to mount the liquid-only dosing unit injector inside the reactor pipe, the knife-edge mount having a trailing edge and a leading edge, each having a knife edge structure so as to minimize recirculation zones and exhaust deviation,
wherein the reactor pipe and the knife-edge mount comprise one or more ports configured to receive one or more coolant lines, electrical lines, and reductant supply lines.

* * * * *